United States Patent [19]
Uehara

[11] Patent Number: 5,959,809
[45] Date of Patent: Sep. 28, 1999

[54] MAGNETORESISTIVE HEAD AND METHOD OF MANUFACTURING THE SAME AND MAGNETIC RECORDING APPARATUS

[75] Inventor: Yuji Uehara, Kanagawa, Japan

[73] Assignee: Fujitsu Limited, Kawasaki, Japan

[21] Appl. No.: 08/923,776

[22] Filed: Sep. 2, 1997

Related U.S. Application Data

[63] Continuation of application No. 08/488,192, Jun. 7, 1995, abandoned.

[30] Foreign Application Priority Data

Jul. 29, 1994 [JP] Japan .................................. 6-178807

[51] Int. Cl.$^6$ ................................ G11B 5/39; G11B 5/31
[52] U.S. Cl. ............................................................ 360/113
[58] Field of Search .............................................. 360/113

[56] References Cited

U.S. PATENT DOCUMENTS

| | | | |
|---|---|---|---|
| 4,713,708 | 12/1987 | Krounbi et al. | 360/113 |
| 4,771,349 | 9/1988 | Tsang | 360/113 |
| 5,262,914 | 11/1993 | Chen et al. | 360/113 |
| 5,344,669 | 9/1994 | Chen et al. | 427/130 |
| 5,363,265 | 11/1994 | Hsie et al. | 360/113 |
| 5,406,433 | 4/1995 | Smith | 360/113 |
| 5,438,470 | 8/1995 | Ravipati et al. | 360/113 |
| 5,483,402 | 1/1996 | Batra | 360/113 |
| 5,485,334 | 1/1996 | Nix et al. | 360/113 |
| 5,491,600 | 2/1996 | Chen et al. | 360/113 |
| 5,532,892 | 7/1996 | Nix et al. | 360/113 |

FOREIGN PATENT DOCUMENTS

| | | |
|---|---|---|
| 63 117309 | 5/1988 | Japan . |
| 63 117310 | 5/1988 | Japan . |
| 63 244408 | 10/1988 | Japan . |
| 3 30109 | 2/1991 | Japan . |
| 4 298809 | 10/1992 | Japan . |
| 5 135331 | 6/1993 | Japan . |
| 5 135332 | 6/1993 | Japan . |
| 5 174334 | 7/1993 | Japan . |
| 5 217126 | 8/1993 | Japan . |

*Primary Examiner*—William J. Klimowicz
*Attorney, Agent, or Firm*—Greer, Burns & Crain, Ltd.

[57] ABSTRACT

A magnetoresistive head of the present invention comprises a non-magnetic layer formed on a soft magnetic layer used for applying a linearizing bias, a ferro-magnetic magnetoresistance layer formed only on the non-magnetic layer in a sense area, a pair of magnetic domain control magnetic layers formed on both sides of the ferro-magnetic magnetoresistance layer and on the non-magnetic layer to control magnetic domains of the ferro-magnetic magnetoresistance layer, and conductive leads connected to the pair of magnetic domain control magnetic layers.

12 Claims, 8 Drawing Sheets

007# MAGNETORESISTIVE HEAD AND METHOD OF MANUFACTURING THE SAME AND MAGNETIC RECORDING APPARATUS

This application is a continuation of application Ser. No. 08/488,192 filed on Jun. 7, 1995, now abandoned.

BACKGROUND OF THE INVENTION

1. Field of the Invention

The present invention relates to a magnetoresistive head and a method of manufacturing the same and a magnetic recording apparatus and, more particularly, a magnetoresistive head used for reading information signals recorded on a magnetic recording medium and a method of manufacturing the same, and a magnetic recording apparatus such as a magnetic disk apparatus, a magnetic card apparatus and a magnetic tape apparatus, having the magnetoresistive head.

2. Description of the Prior Art

In order to put a magnetic head employing magnetoresistance effect to practical use, a magnetoresistance layer (referred to as an MR layer hereinafter) composed of a ferro-magnetic material must respond linearly to a magnetic signal field generated by a recording medium.

A magnetic bias should be applied to the MR layer to attain a linear response of the MR layer. Such magnetic bias is called as a linearization bias. Several approaches have been known as means for applying the linearization bias. As one of the approaches, a soft magnetic layer is arranged near the MR layer to apply the linearization bias thereto. This approach has advantages such as a good bias efficiency and a small shift in a bias point by sense current.

Figure 1:
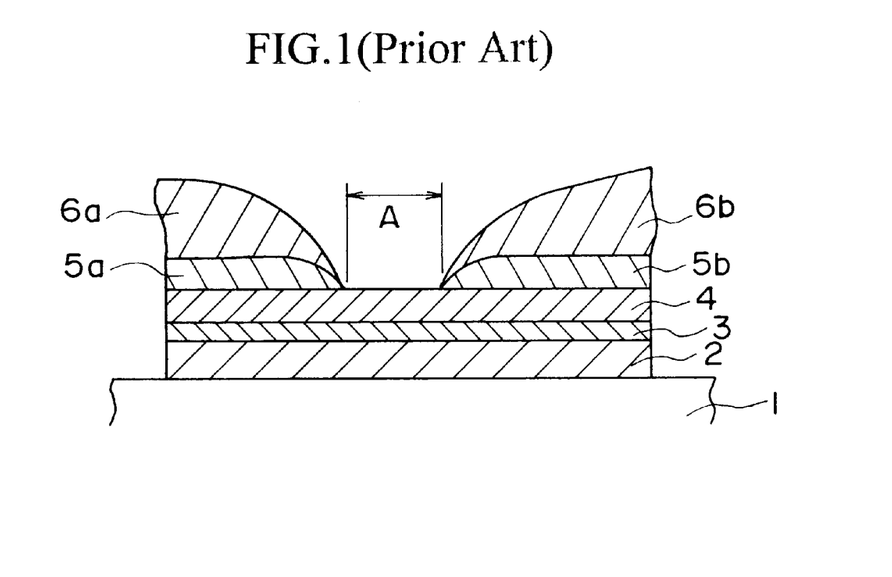
FIG. 1 is a sectional view showing an example of a conventional MR device.

A conventional MR device is disclosed in Patent Application Publication (KOKAI) 63-117310, for example. As shown in FIG. 1, the conventional MR device is constituted.

Referring to FIG. 1, a soft magnetic layer 2, a non-magnetic separating layer 3, and an MR layer 4 are formed on a substrate 1 in that order. They are formed to have their rectangular plane shapes. Two antiferromagnetic films 5a and 5b for controlling magnetic domains of the MR layer 4 are then formed on the MR layer 4 so as to put a sense area A therebetween. Conductive leads 6a and 6b are then formed on the antiferromagnetic films 5a and 5b respectively.

Since, in the magnetic head so constructed above, the MR layer 4 is formed on the outside of both sides of the sense area A of the MR device, the MR layer 4 located near the sense area A also detects the magnetic field generated by the recording medium. Consequently, the sense area A is vaguely defined. This therefor becomes an obstacle to attaning a small distance between tracks of the magnetic recording medium and a high density of the magnetic recording medium. It would be preferable that the sense area A be more distinctly defined by the space between two conductive leads 6a and 6b.

Figure 2:
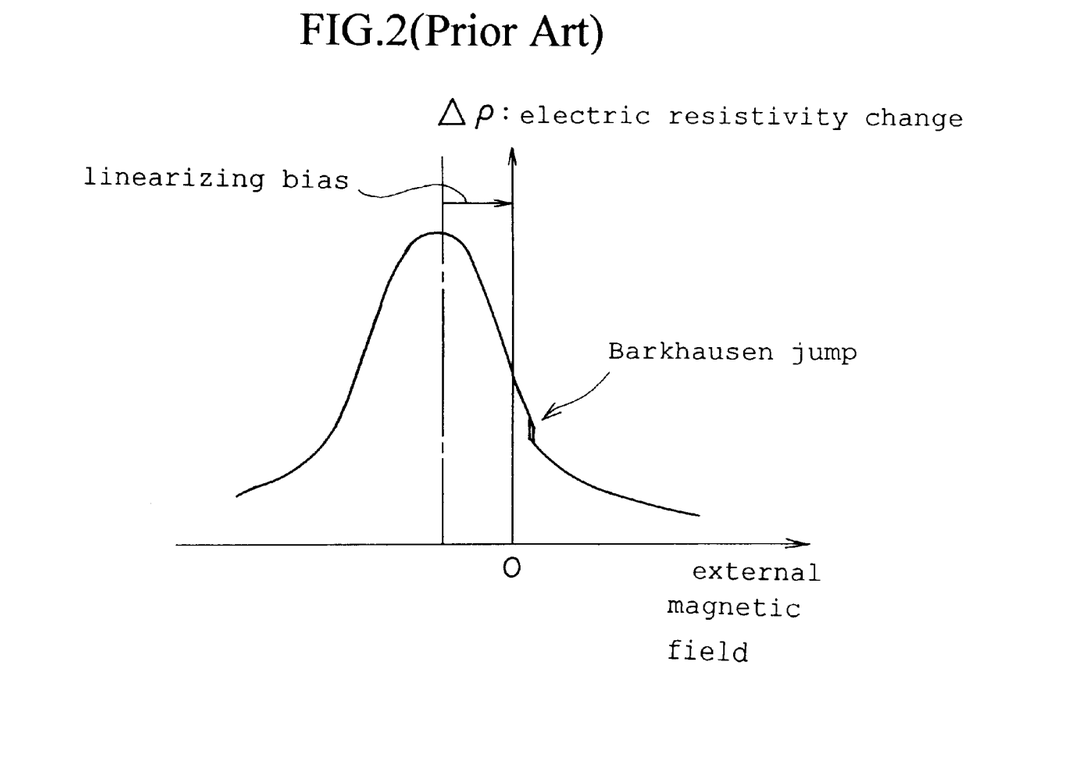
FIG. 2 is a plan view showing a characteristic curve showing a relation between an electric resistivity change and an external magnetic field of the conventional MR device.

Upon forming layers, the MR layer 4 is magnetized simultaneously with the soft magnetic layer 2 and in the same direction as those of the soft magnetic layer 2. However, the direction of the magnetization of the soft magnetic material is inherently unstable. Therefore, the direction thereof tends to vary by an external magnetic field. As a result, as shown in FIG. 2, a Barkhausen jump which results in an output fluctuation of the MR device is readily caused. The Barkhausen jump appears as a hysteresis loop in part of a characteristic curve of a change in electric resistivity ($\rho$) of the MR layer against an external magnetic field (H).

On the contrary, another magnetic head, wherein the MR film 4 is formed to have the substantially same width as that of the track and soft magnetic films with a small magnetoresistance effect are disposed on both sides of the MR film 4, has been proposed in Patent Application Publications (KOKAIs) 4-298809 and 3-30109.

According to this magnetic head, the vague sense area of the MR film is never caused and further the Barkhausen jump is scarcely caused because of the absence of the soft magnetic film.

However, since no mechanism for supplying a linearization bias is provided in the structure of this magnetic head, it is not practical that such magnetic head is adopted as it is. In addition, there is not provided a mechanism for reducing the Barkhausen jump which is caused by instability of the magnetic field of the soft magnetic film disposed in parallel to the MR layer. Besides, since no antiferro-magnetic films exists on both sides of the MR layers, it is not disclosed as a concrete structure how to control magnetic domains (i.e., magnetization directions) of the MR layer.

SUMMARY OF THE INVENTION

The present invention has been made in view of the above drawbacks, and an object of the present invention is to provide a magnetic head of magnetoresistance type, which can easily be applied to recording media with high density and in which a Barkhausen jump can be prevented from being generated and a control of magnetic domains can be facilitated.

According to the present invention, in order to control magnetic domain (magnetization direction) of an MR layer, magnetic layers (referred to as "magnetic domain control magnetic layers" hereinafter) are formed on both sides of the MR layer by eliminating the MR layer except for a sense area.

As a result, the MR layer is scarcely influenced by a magnetic field generated by the outside of the sense area. Therefore, it is enabled to narrow a distance between tracks of the magnetic recording medium, and a high density recording on the magnetic recording medium can be facilitated. Besides, the magnetic domains of the MR layer can be controlled by magnetic domain control magnetic layers.

In the meanwhile, by the rotation of the magnetization of the MR layer and the rotation of the magnetization of the soft magnetic layer for a linearizing bias magnetic charges are generated on both sides of rotated areas. If a magnetic field is generated by the magnetic charges in the reverse (i.e., minus) direction against the direction of the magnetic domain control magnetic field, the Barkhausen jump is readily apt to occur.

On the contrary, since, in the present invention, a product Brt of a film thickness t of hard magnetic layers (or soft magnetic layers), which constitutes magnetic domain control magnetic layers formed on both sides of the MR layer, and saturation magnetic flux density Br is set larger than a product Brt of the MR layer, the magnetization of the MR layer is stabilized. As a result, the likelihood of a Barkhausen jump is reduced.

In addition, since the magnetization of the MR layer is coupled to the magnetization of the linearizing bias soft magnetic layer in reverse-parallel, the magnetization of the soft magnetic layer is stabilized. As a result, the likelihood of a Barkhausen jump is further reduced.

If a length of the soft magnetic layer for supplying the linearizing bias is formed to be less than 20 $\mu$m, the soft magnetic material is magnetized by the external magnetic field generated by the magnetic domain control magnetic layer. Thereby, the magnetization of the MR layer and the magnetization of the soft magnetic layer are coupled to each other in reverse-parallel.

Further, in the present invention, magnetic layers for magnetic domain control and connecting electrodes are patterned by means of a lift-off method, using a mask for performing patterning of the MR layer. Thus, the magnetic layers for magnetic domain control and the connecting electrodes are arranged in adjacent with high accuracy.

Furthermore, in the present invention, an insulating film is formed between the MR device described above and the conductive magnetic shield substrate therebeneath, the magnetic shield can be prevented from being exposed when unnecessary portions of the MR device are removed. Even if the conductive leads of the MR device are formed on the removed portions, a short-circuit between the terminal of the MR device and the magnetic shield is not found. Thus, when a distance between magnetic shields formed on the MR device become small, the MR device of the present invention becomes significantly advantageously.

If the insulating film becomes thin during manufacturing steps of the MR device, following steps are taken. That is, when patterning the soft magnetic layer, MR layer etc. on the insulating film, the mask is formed to have an inverse-trapezoid sectional shape. In addition, if a second insulating film is formed on the mask and the insulating film after the patterning and before removing the mask, the second insulating film is added to the insulating film as a base layer, to thus increase a entire film thickness in a self-alignment manner. Therefore, a distance between the conductive leads of the MR device and the magnetic shield is enlarged, so that a short-circuit between them can be firmly prevented. The second insulating film on the MR device is removed, along with the mask.

DETAILED DESCRIPTION OF THE PREFERRED EMBODIMENTS

There will now be described preferred embodiments of the present invention hereinafter with reference to the accompanying drawings.
(First Embodiment)

The first embodiment of the present invention will now be described hereinbelow with reference to FIGS. 3A to 6.

FIGS. 3A to 3F are sectional views illustrating manufacturing steps of a magnetic head having a magneto-resistance layer according to the first embodiment of the present invention.

Figure 3A:
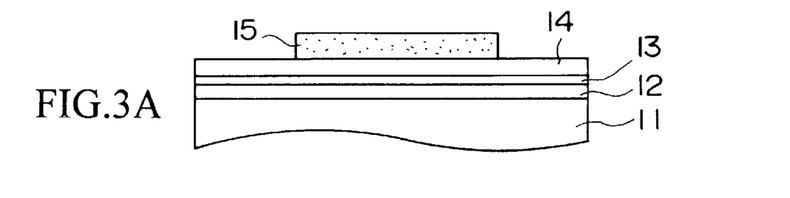
FIGS. 3A to 3F are sectional views each showing manufacturing steps of an MR device according to the first embodiment of the present invention.

First, as shown in FIG. 3A, a soft magnetic layer 12 made of NiFeCr, a nonmagnetic layer 13 made of Ta, and an MR layer 14 made of NiFe are formed on a substrate 11 by a sputtering method in order and sequentially. A thickness of the soft magnetic layer 12 is 200 Å, a thickness of the nonmagnetic layer 13 is 100 Å, and a thickness of the MR layer 14 is 200 Å. The soft magnetic layer 12 is arranged to linearize the magnetic field of the MR layer 14 by applying a magnetic bias to the MR layer 14.

Figure 3B:
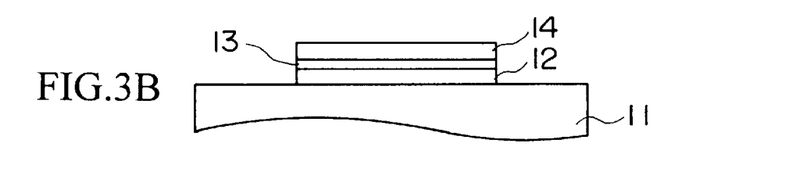

Subsequently, the first resist film 15 is applied to the MR layer 14 by spin-coating. The first resist film 15 is exposed and then developed to form a pattern covering an MR device forming area. Thereafter, as shown in FIG. 3B, using the first resist film 15 as a mask, the MR layer 14 through the soft magnetic layer 12 are etched by ion milling (also called as sputter etching), so that these layers are formed as a rectangular plane shape. A size of the rectangular plane shape has a length of 20 μm in the direction of flowing the sense current and a width of 2 μm in the direction perpendicular thereto. Argon gas is used in the ion milling.

Figure 3C:
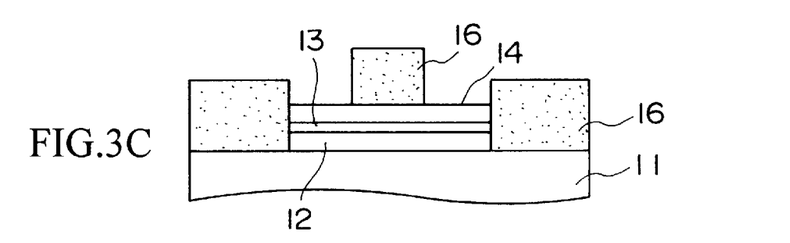

In addition, as shown in FIG. 3C, after removing the first resist film 15, the sense area of the MR layer 14 and the substrate 11 around the soft magnetic layer 12 are covered by the second resist film 16. Then, while using the second resist film 16 as a mask, part of the MR layer 14 is removed by etching using the ion milling.

Figure 3D:
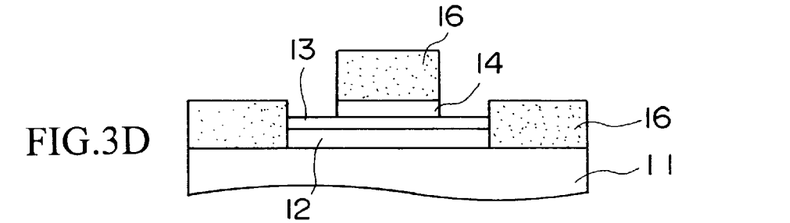

Thereby, as shown in FIG. 3D, the MR layer 14 is left just in the sense area and its very near area, thus exposing the nonmagnetic layer 13 on both sides of the MR layer 14. As a result, the MR layer 14 has the same width as a track width of the recording medium.

The substrate 11 can be formed of any material which may serve as a magnetic shield. A gap layer made of $Al_2O_3$ is interposed between an upper surface of the substrate 11 and the soft magnetic layer 12. These structures are also employed similarly in the second embodiment.

Figure 3E:
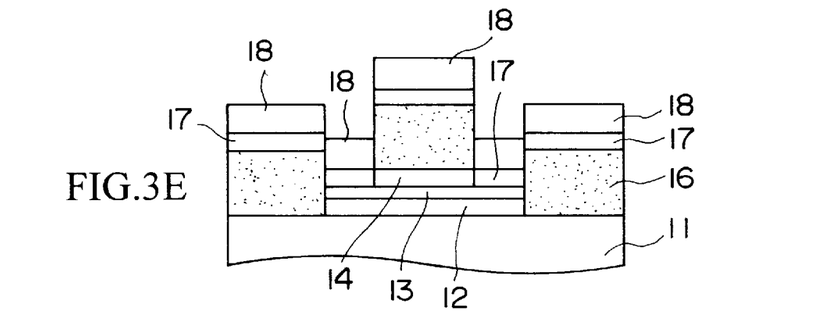

Next, as shown in FIG. 3E, with remaining the second resist film 16 as it is, a hard magnetic layer 17 made of CoCrTa is formed by the sputtering on the second resist film 16 and the nonmagnetic layer 13 so as to have a thickness of 300 Å. A conductive layer 18 made of Au having a thickness of 2000 Å is formed by evaporation on the hard magnetic layer 17.

When, as a minimum, the hard magnetic layer 17 is formed, a magnetic field is applied to layers in the longitudinal direction of the MR device. Thus, saturation magnetization of the hard magnetic layer 17 is completed.

Therefore, magnetic domains of the MR layer 14 are controlled by the magnetic field generated by the hard magnetic layer 17 as an external magnetic field.

Since saturation magnetic flux density of the hard magnetic layer 17 described above is 0.8 T, a product Brt of the saturation magnetic flux density Br and a film thickness t becomes 2.4 T·Å. In addition, since the saturation magnetic flux density of the MR layer 14 described above is 0.95 T, a product Brt of the saturation magnetic flux density Br and a film thickness t becomes 1.9 T·Å. Thus, the product Brt of the MR layer 14 becomes smaller than that of the hard magnetic layer 17.

Figure 3F:
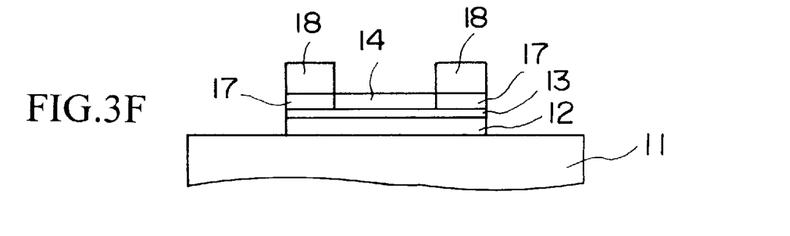

As shown in FIG. 3F, after the conductive layer 18 is formed, the second resist film 16 is removed. Then, the hard magnetic layer 17 and the conductive layer 18 are removed from the surfaces of the MR layer 14 and the substrate 11. The conductive layers 18 remaining on both sides of the MR layer 14 are used as conductive leads for supplying a predetermined current to the MR layer 14. The MR device can be formed on the substrate 11 via the above fabricating steps.

Figure 4:
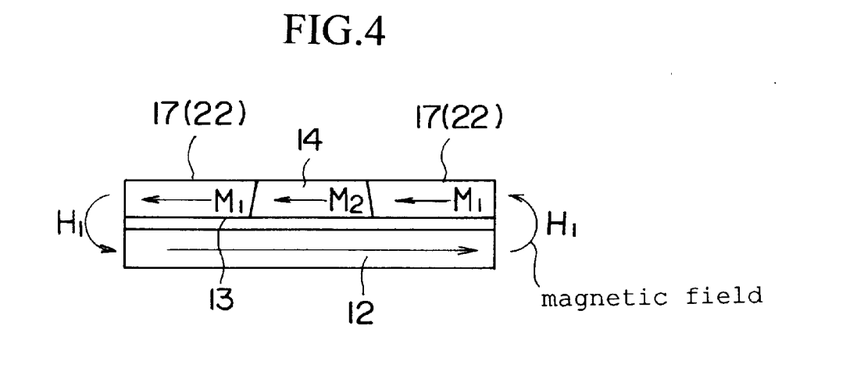
FIG. 4 is a side view showing magnetization state of the MR device according to the first embodiment of the present invention.

As shown in FIG. 4, the direction of magnetization of the MR device described advance is determined.

The magnetic domains of the MR layer 14 are controlled by the hard magnetic layer 17 formed on both sides of the MR layer 14. Therefore, magnetization $M_1$ and $M_2$ caused in both the MR layer 14 and the hard magnetic layer 17 are directed in the same direction, which is identical to the sense current flowing direction. In addition, since the soft magnetic layer 12 is coupled to the MR layer 14 by an external magnetic field $H_1$ generated by the hard magnetic layer 17 in the inverse direction, inner magnetization $M_3$ of the soft magnetic layer 12 is generated in the reverse direction to that of the MR layer 14. This is because, if a length of the soft magnetic layer 12 is 20 $\mu$m or less, the magnetic domains (magnetization direction) of the soft magnetic layer 12 are in a state where they are readily controlled by the external magnetic field $H_1$ because of relations among film thickness, material and Brt thereof. In the first embodiment, the external magnetic field corresponds to the magnetic field generated by the hard magnetic layer 17, and has the reverse direction to the direction of the magnetization $M_2$ in the MR layer 14.

Figure 5:
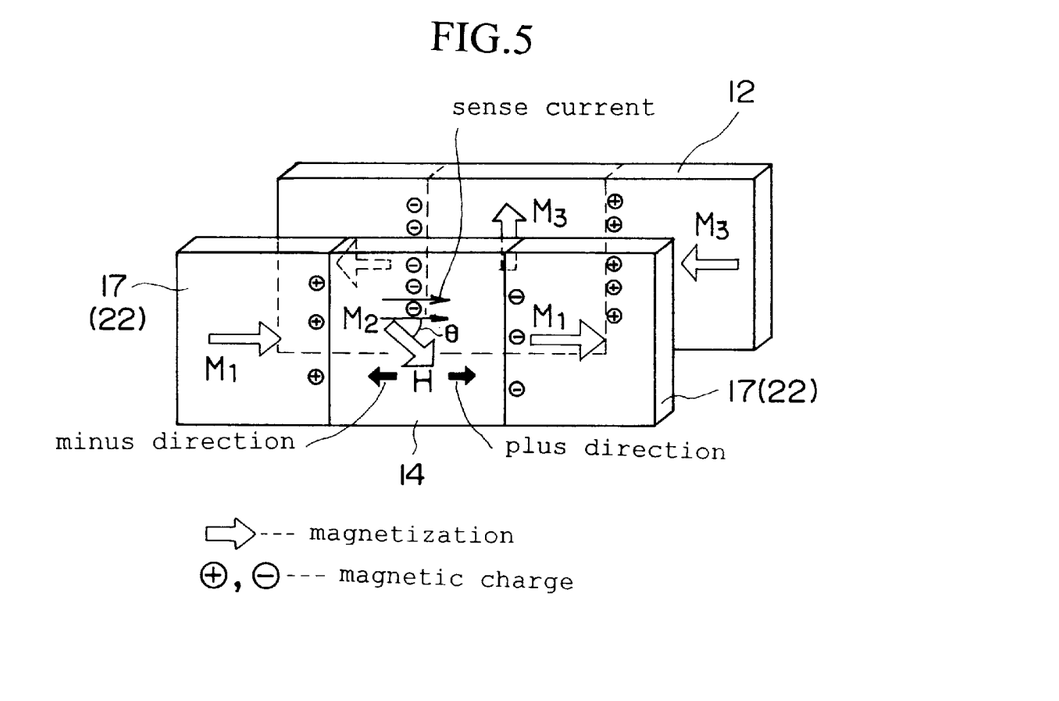
FIG. 5 is a view showing an MR layer of the MR device according to the first embodiment of the present invention and magnetic charges generated by a rotation of magnetization direction in a soft magnetic layer used for linearization bias.

In an operating condition where the sense current is being flowed, the direction of the magnetization $M_2$, $M_3$ in the soft magnetic layer 12 and the MR layer 14 becomes as shown in FIG. 5. In other words, the magnetization $M_3$ of the soft magnetic layer 12 is directed in the direction perpendicular to that of the sense current by the magnetic field generated by the sense current. Thereby, a magnetic field for linearizing bias is generated by the soft magnetic layer 12. The magnetization $M_2$ of the MR layer 14 is rotated by the magnetic field for linearizing bias to thus be inclined against the sense current at an angle θ.

Since the magnetization $M_2$ of the MR layer 14 and the magnetization $M_3$ of the soft magnetic layer 12 are rotated as described above, magnetic charges shown in FIG. 5 are generated in respective layers. If a magnetic field H are generated by these magnetic charges in a minus direction, the Barkhausen jump easily occurs.

However, according to the MR device of the first embodiment, the Brt of the hard magnetic layer 17 formed in the outside of the sense area is set larger than that of the MR layer 14. Thus, a component of the magnetic field H in the minus direction is reduced. In addition, as you will see, a magnetic field H in a plus direction can also generated by varying their products Brt.

Because of the relations between the anti-parallel coupling and the product of the film thickness and the saturation magnetic flux density, as described above, locations of magnetic walls in the MR layer 14 and the soft magnetic layer 12 are stabilized, so that the Barkhausen jump is hardly generated.

By examining an output variation of the MR device according to the first embodiment, the output variation was ranged within ±2%. On the other hand, according to the conventional MR device shown in FIG. 1, the output variation was within ±5%. Therefore, it can be understood that the output of the MR device of the present invention becomes stable in contrast to that of the conventional MR device. Here, the output variation is defined as a variation in a reproducing output voltage when recording operations and reproducing operations are repeated. Further, when a ρ-H characteristic of the MR device was measured, a clear waveform without the Barkhausen jump could be obtained.

Figure 6:
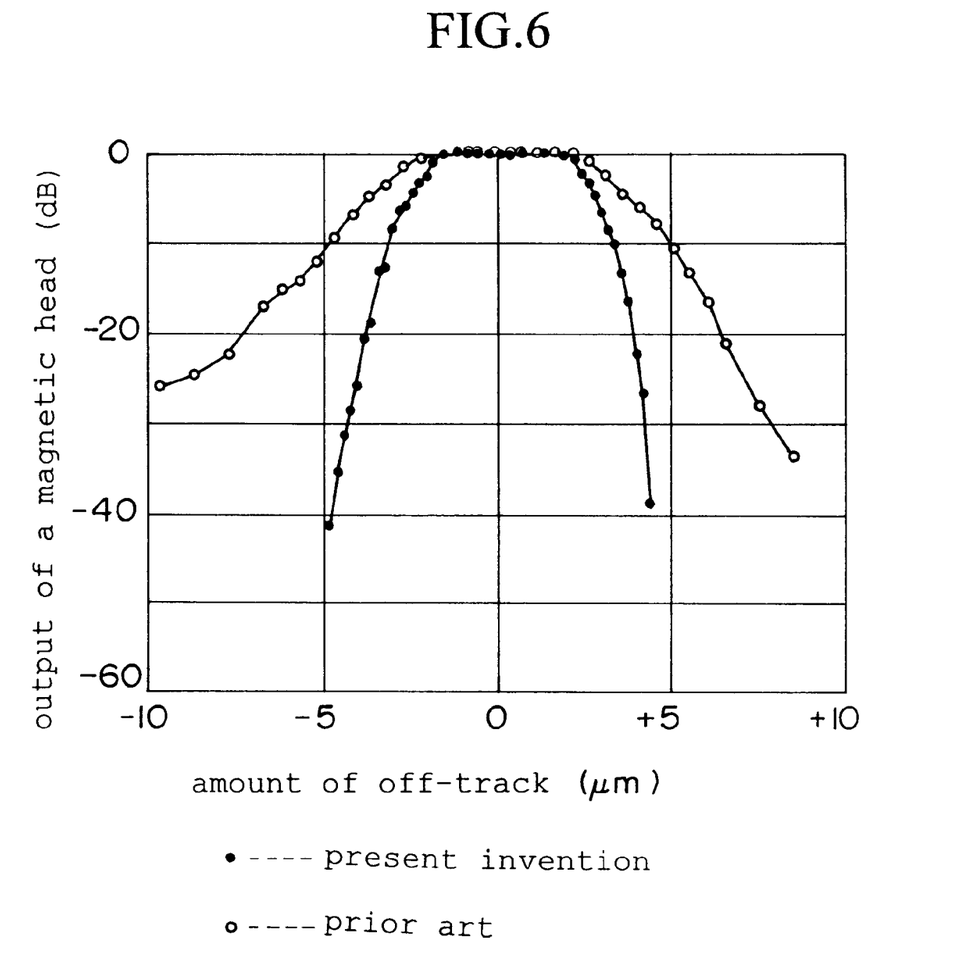
FIG. 6 is a characteristic view showing relationships between an amount of off-track and an output of a magnetic head in both the MR device according to the first embodiment of the present invention and conventional MR device.

In the meanwhile, since the MR layer 14 is formed only in the sense area and its very near area, a change in resistivity of the MR layer 14 is not affected by the magnetic fields which is generated by the medium outside the sense area. For this reason, relationships between an amount of off-track of the magnetic head and an output of the magnetic head are then compared in the MR device of the first embodiment of the present invention and the MR device in FIG. 1. As a result, as shown in FIG. 6, it has been found that the MR device of the first embodiment of the present invention has a good off-track characteristic in comparison with the conventional MR device. Namely, since an output of the magnetic head is largely lowered if the magnetic head is in a state of off-track, it can be understood that vagueness on identifying a core width in the sense area of the MR layer 14 is made small.

Therefore, high density of the magnetic medium can be secured since the MR layer 14 receives extremely small information from the peripheral area of the track of the magnetic medium when it is in an on-track state.

In the meanwhile, according to the above fabricating steps, the width of the MR layer 14 becomes identical to a gap formed in one of the connecting electrodes. Thus, a manufacturing yield is not lowered even if the patterning step is added.

In the areas of the soft magnetic layers 12 which are opposed to the MR layer 14 and put the nonmagnetic layer 13 therebetween, the magnetization direction is rotated by about 90° by the magnetic field generated around the flowing path of the sense current when the sense current flows in the MR layer 14. Thereby, the linearizing bias is applied to the MR layer 14. This fact is true similarly of the following embodiments.

(Second Embodiment)

In the MR device, in order to control magnetic domains (magnetization direction) of the MR layer and the soft magnetic layer, an antimagnetic layer may be employed instead of the ferromagnetic layer described above. The second embodiment employing such antimagnetic layer will be described in the following.

FIGS. 7A to 7E are sectional views each showing manufacturing steps of a magnetic head having a magneto-resistance layer according to the second embodiment of the present invention.

Figure 7A:
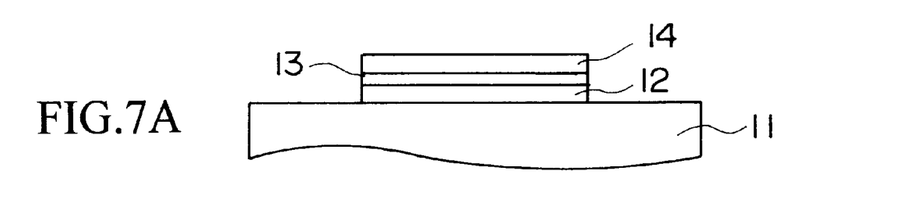
FIGS. 7A to 7E are sectional views each showing manufacturing steps of an MR device according to the second embodiment of the present invention.

First, as shown in FIG. 7A, a first soft magnetic layer 12 made of NiFeCr, a nonmagnetic layer 13 made of Ta, and an MR layer 14 made of NiFe, each having a rectangular plane shape, are formed in turn on a substrate 11. Film thicknesses of these layers, the growth method, and the patterning process are the same as those used in the first embodiment. A length of the first soft magnetic layer 12 in the direction of the sense current is set to be equal to or smaller than 20 μm.

Figure 7B:
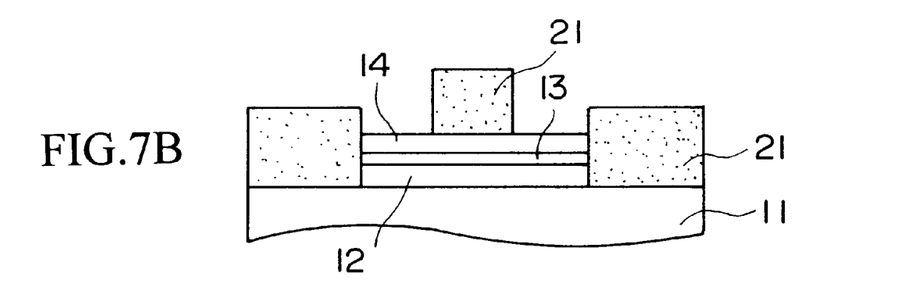

Then, as shown in FIG. 7B, after a sense area of the MR layer 14 and the substrate 11 surrounding the first soft magnetic layer 12 are covered by the resist film 21, part of the MR layer 14 is removed by the etching by means of the ion milling, using the resist film 21 as a mask.

Figure 7C:
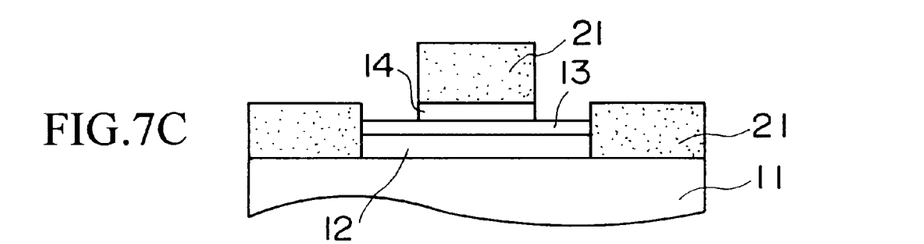

Thereby, as shown in FIG. 7C, the MR layer 14 is left only in the sense area, the nonmagnetic layers 13 are exposed from both sides. Thus, the width of the MR layer 14 is set to be substantially identical to a track width of the recording medium.

Figure 7D:
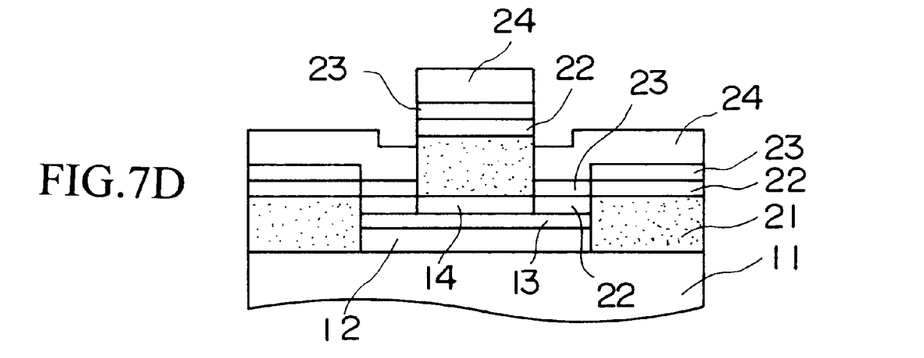

In turn, as shown in FIG. 7D, with leaving the resist film 21, a second soft magnetic layer 22 made of NiFeCr having small magnetoresistance effect is formed on the resist film 21 and the nonmagnetic layer 13 so as to have a thickness of 300 Å. Subsequently, an antiferromagnetic layer 23 made of FeMn is formed to have a thickness of 200 Å. The second soft magnetic layer 22 and the antiferromagnetic layer 23 are formed by sputtering. In addition, a conductive layer 24 made of Au and having a thickness of 2000 Å is formed by evaporation on the antiferromagnetic layer 23. Furthermore, NiO, NiMn etc. are raised as material of the antiferromagnetic substance.

When, in the least, the second soft magnetic layer 22 and the antiferro-magnetic layer 23 are formed, the magnetic field which is in parallel to the longitudinal direction of the MR device is applied to the layers. Thereby, the second soft magnetic layer 22 is saturation-magnetized in the longitudinal direction of the MR device and the magnetic domains of the MR layer 14 are controlled by the second soft magnetic layer 22. The antiferro-magnetic layer 23 is formed to hold magnetization of the second soft magnetic layer 22.

Since the saturation magnetic flux density of the second soft magnetic layer 22 is 0.7 T, a product Brt of the saturation magnetic flux density Br and the film thickness t becomes 2.1 T·Å. Also, since the saturation magnetic flux density of the MR layer 14 described above is 0.95 T, a product Brt of the saturation magnetic flux density Br and the film thickness t becomes 1.9 T·Å, which is smaller than the product Brt of the second soft magnetic layer 22.

Figure 7E:
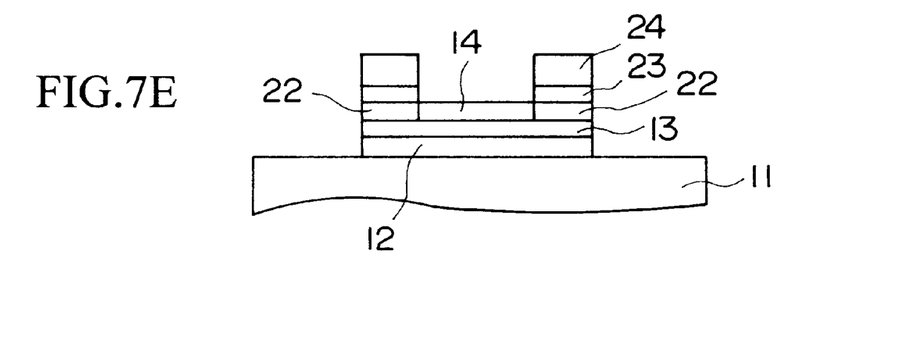

Subsequently, as shown in FIG. 7E, the second soft magnetic layer 22, the antiferro-magnetic layer 23 and the conductive layer 24 are removed from the peripheral areas the sense area and the first soft magnetic layer 12 by removing the resist film 21. The conductive layers 24 remaining on both sides of the MR layer 14 are used as conductive leads for supplying a fixed current to the MR layer 14. With the above, the MR device has been completed.

In the MR layer 14 of the MR device described above, magnetic domains are controlled by the second soft magnetic layer 22 to be magnetized in the same direction as that of the sense current. Besides, since the second soft magnetic layer 22 is formed of a material having small magnetoresistance effect, information recorded on recording medium are never detected by the second soft magnetic layer 22 per se. Accordingly, since the magnetic field generated by the recording medium is detected only by the MR layer 14 which is formed merely in the sense area and its very near area, uncertainty of the sense area can be eliminated perfectly also in the second embodiment, as in the first embodiment.

Therefore, since the MR layer 14 receives an extremely reduced amount of information from the peripheral area of the magnetic medium track in an on-track state, a narrow distance between the tracks can be attained, thus permitting much higher density recording of the magnetic recording medium.

While, since the first soft magnetic layer 12 is formed to have a length of 20 μm or less in the direction of the sense current, it is readily magnetized by the external magnetic field from the second soft magnetic layer 22. As shown in FIG. 4, the magnetization direction of the first soft magnetic layer 12 is formed reversely to that of the MR layer 14, and the magnetization of the first soft magnetic layer 12 and the MR layer 14 are coupled in reverse-parallel. In addition, since the product Brt of the second soft magnetic layer 22 is set larger than the product Brt of the MR layer 14, a minus component of the magnetic field H generated by the magnetic charges can be reduced, like the first embodiment (FIG. 5).

Because of the relations between the anti-parallel coupling and the product of the film thickness and the saturation magnetic flux density, as described above, locations of magnetic walls in the MR layer 14 and the soft magnetic layer 12 are stabilized, so that the Barkhausen jump is hardly generated. Further, when a ρ-H characteristic of the MR device was measured, a clear waveform without the Barkhausen jump could be derived.

According to the second embodiment, the second soft magnetic layer and the antiferro-magnetic layer are formed to control the magnetic domains of the MR layer 14. Thus, if it is desired to shorten a film growth time, the first embodiment may be employed.

(Third Embodiment)

FIGS. 8A to 8E are sectional views each showing manufacturing steps of an MR device according to the third embodiment of the present invention.

Figure 8A:
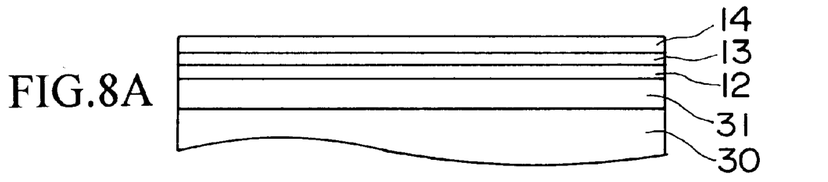
FIGS. 8A to 8E are sectional views each showing manufacturing steps of an MR device according to the third embodiment of the present invention.

With reference to FIGS. 8A to 8E, a structure for preventing a short-circuit between the terminal connected to the MR device and the substrate (magnetic shield substrate) in the first and second embodiments and manufacturing steps thereof will be explained. First, as shown in FIG. 8A, a gap insulating layer 31 formed of $Al_2O_3$ having a thickness of 1300 Å is formed by sputtering process on a magnetic shield substrate 30 made of the soft magnetic material. After this, under the same condition and using the same materials as those in the first and the second embodiments, a soft magnetic layer 12, a nonmagnetic layer 13, the MR layer 14 are formed in order. Film forming condition, film thickness etc. of the soft magnetic layer 12, the nonmagnetic layer 13, and the MR layer 14 are formed based on those of the first embodiment.

Figure 8B:
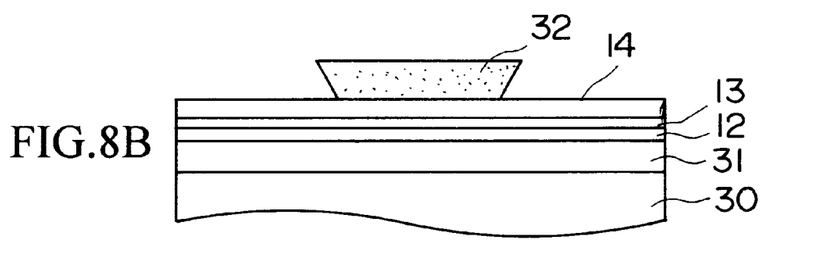

Then, as shown in FIG. 8B, a resist film 32 is applied on the MR layer 14 by spin-coating. The resist film 32 having a reverse-taper sectional shape is left in an MR device forming area by exposing and developing it. An image reversal resist is employed, for example, as the resist film 32. By using a feature that an edge portion of the exposure pattern is rounded off as the resist film 32 becomes deep, the reverse-taper sectional shape is formed.

Figure 8C:
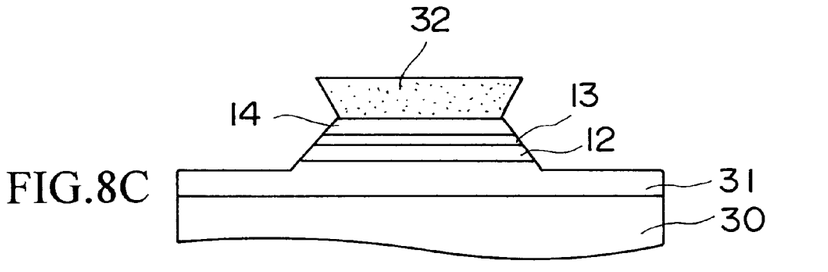
Figure 8D:
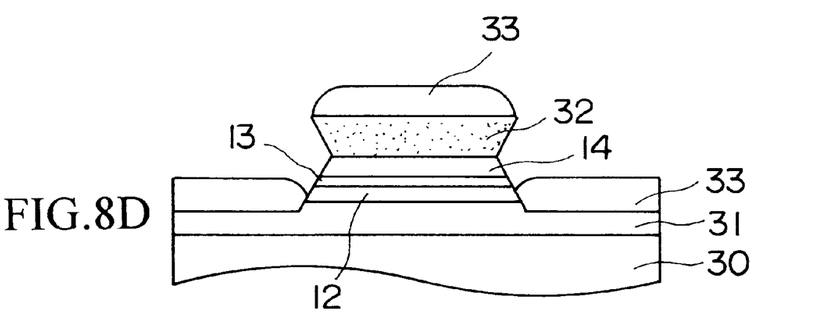
Figure 8E:
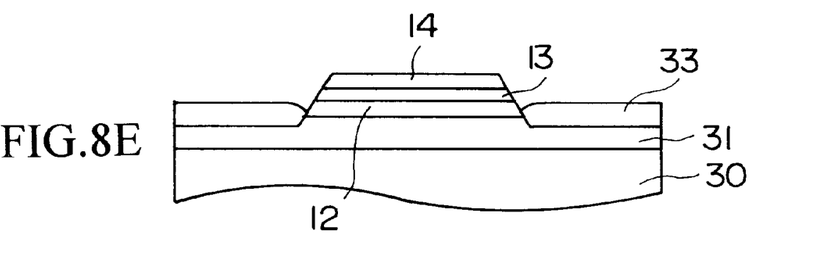

Thereafter, as shown in FIG. 8C, the soft magnetic layer 12, the nonmagnetic layer 13, the MR layer 14 and an upper portion of the gap insulating layer 31 are formed in a taper-shape by ion milling process, using the resist film 32 as a mask. A plane shape of these layers is formed as a rectangular shape, and a size thereof is the same as that of the first embodiment.

Subsequently, with leaving the resist film 32, an $Al_2O_3$ layer 33 is formed by the sputtering process on the resist film 32 and the gap insulating layer 31 to have a thickness of 400

Å. Thereafter, the Al$_2$O$_3$ layer 33 remains only on the gap insulating layer 31 around the MR device forming area by removing the resist film 32. In consequence, the gap insulating layer 31 becomes thick in a self-alignment manner.

Succeeding manufacturing steps are the same as in the first and the second embodiments.

Figure 9:
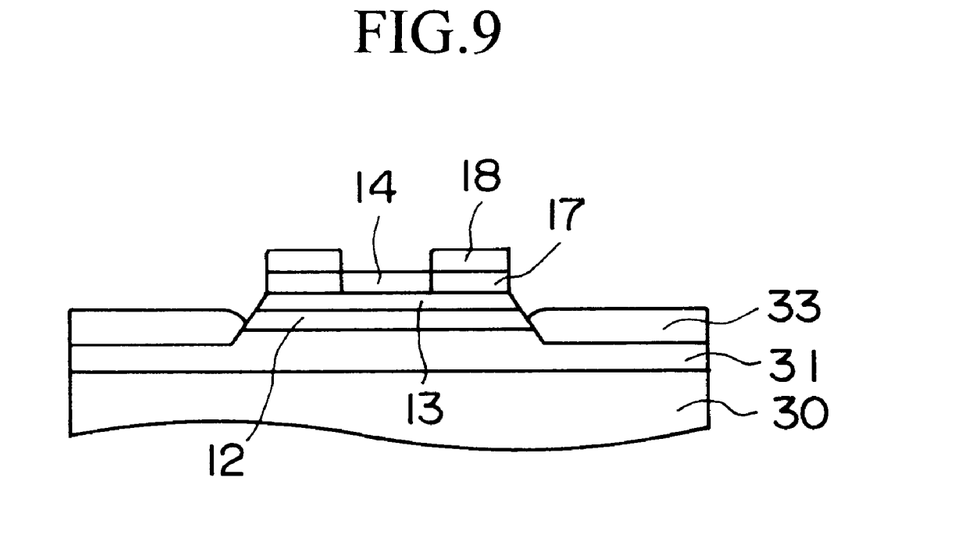
FIG. 9 is a sectional view showing the first example of the MR device formed via manufacturing steps according to the third embodiment of the present invention.

As shown in FIG. 9, MR layer 14 is formed on the nonmagnetic layer 13 in the sense area only. The hard magnetic layer 17 and the leads 18 are formed on the nonmagnetic layer 13 bothsides of the sense area.

The hard magnetic layer 17 and the leads 18 are patterned by lift-off method using the resist mask which is used for patterning the MR layer 14.

Figure 10:
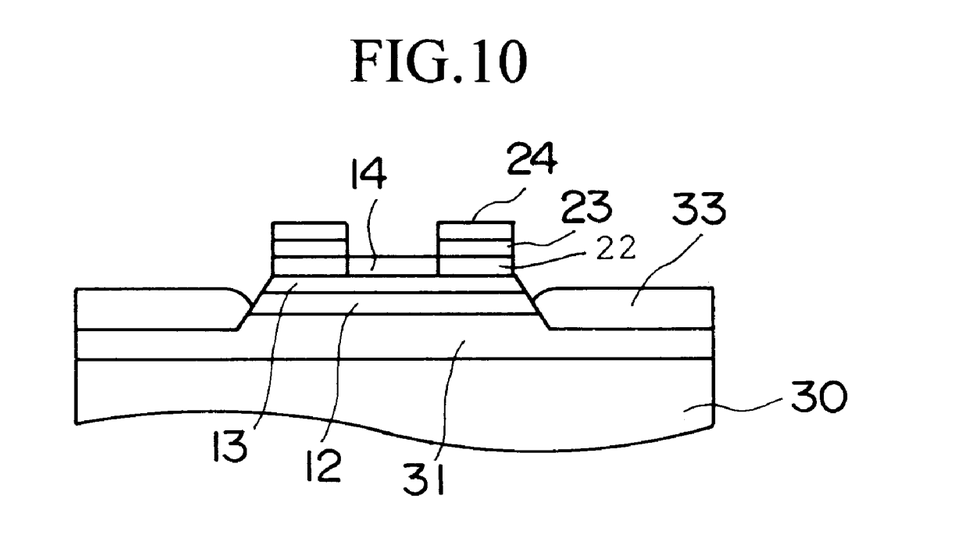
FIG. 10 is a sectional view showing the second example of the MR device formed via manufacturing steps according to the third embodiment of the present invention.

As shown in FIG. 10, MR layer 14 is formed on the nonmagnetic layer 13 in the sense area only. The soft magnetic layer 22 and the antiferro-magnetic layer 23 and the leads 24 are formed on the nonmagnetic layer 13 in order bothsides of the sense area.

The soft magnetic layer 22 and the antiferro-magnetic layer 23 and the lead 24 are patterned by lift-off method using the resist mask which is used for patterning the MR layer 14.

The MR device formed via the manufacturing steps employed in the first embodiment is shown in FIG. 9. The MR device formed via the manufacturing steps employed in the second embodiment is shown in FIG. 10. In FIGS. 9 and 10, the same references as used in FIGS. 3A to 3F and FIGS. 7A to 7E denote the same elements.

The MR device so formed described above exhibits not only good reproducing characteristic as described in the first and the second embodiments, but also the short-circuit between the MR conductive leads 18, 24 and the magnetic shield substrate 30 scarcely appears if the magnetic shield are arranged in both sides of the MR device.

The third embodiment is significantly useful especially when a gap length between shields becomes small.

(Fourth Embodiment)

Next, a magnetic head of a magnetic recording apparatus to which the MR device described above can be applied and a magnetic recording medium will be described briefly with reference to FIG. 11.

Figure 11:
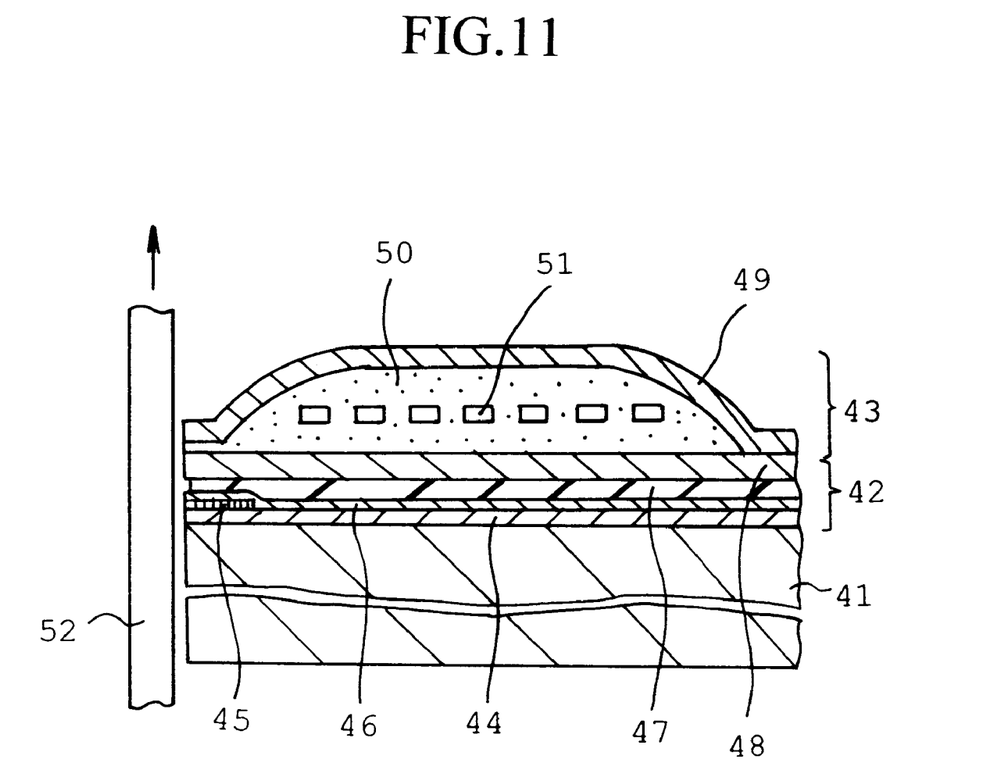
FIG. 11 is a sectional view showing a pertinent portion of a magnetic recording apparatus to which each of MR devices according to the first to third embodiments of the present invention can be applied.

Referring to FIG. 11, a reproducing head 42 and a writing head 43 are formed adjacently on a substrate 41 made of silicon.

The reproducing head 42 comprises a first magnetic shield layer 44, an MR device 45 formed on the first magnetic shield layer 44 via an insulating layer (not shown), a connecting electrode 46 connected to the MR device 45, an insulating film 47 for covering the MR device 45 and the connecting electrode 46, and a second magnetic shield layer 48 formed on the insulating film 47. The MR devices 45 having the same structures as those described in the above embodiments are employed.

While, the writing head 43 comprises the second magnetic shield layer 48, a third magnetic shield layer 49, and a coil 51 formed therebetween via an insulating layer 50. Each of the first to third magnetic shield layers 44, 48 and 50 is made of a soft magnetic material. In the first to third magnetic shield layers 44, 48 and 50, air gaps are formed in portions thereof opposed to the magnetic recording medium 52.

What is claimed is:

1. A magnetoresistive head comprising:
   a soft magnetic layer for applying a linearizing bias;
   a non-magnetic layer formed on said soft magnetic layer;
   a ferro-magnetic magnetoresistance layer formed on said non-magnetic layer and having a length shorter than said non-magnetic layer;
   a pair of magnetic domain control magnetic layers formed on both sides of said ferro-magnetic magnetoresistance layer and on said non-magnetic layer, for controlling magnetic domains of said ferro-magnetic magnetoresistance layer; and
   a pair of conductive leads formed on both sides of said ferro-magnetic magnetoresistance layer, each being connected to a respective one of said pair of magnetic domain control magnetic layers;
   wherein said soft magnetic layer and said ferro-magnetic magnetoresistance layer are magnetically coupled so that the magnetization direction of said soft magnetic layer is in a direction opposite to the magnetization direction of said ferro-magnetic magnetoresistance layer.

2. A magnetoresistive head according to claim 1, wherein said pair of magnetic domain control magnetic layers are made of a hard magnetic layer.

3. A magnetoresistive head according to claim 2, wherein a product of a thickness of said pair of magnetic domain control magnetic layers and a saturation magnetic flux density thereof is larger than a product of a film thickness of said ferro-magnetic magnetoresistance layer and a saturation magnetic flux density thereof.

4. A magnetoresistive head according to claim 2, wherein said hard magnetic layer is formed of a cobalt-chromium-tantalum alloy, and said ferro-magnetic magnetoresistance layer is formed of an iron-nickel alloy.

5. A magnetoresistive head according to claim 1, wherein a length of said ferro-magnetic magnetoresistance layer is identical to a distance between said pair of conductive leads.

6. A magnetoresistive head according to claim 1, wherein a length of said soft magnetic layer is less than 20 µm.

7. A magnetoresistive head according to claim 1, further comprising a substrate wherein an insulating film is formed between said soft magnetic layer and said substrate therebeneath.

8. A magnetoresistive head according to claim 1, wherein said pair of magnetic domain control magnetic layers are layered on said non-magnetic layer so that said non-magnetic layer separates said pair of magnetic domain control magnetic layers from said soft magnetic layer,
   wherein said soft magnetic layer is influenced through a side of each magnetic domain control magnetic layer in said pair so that a direction of magnetization in said soft magnetic layer is opposite the direction of magnetization in said pair.

9. A magnetoresistive head according to claim 1, wherein said opposite direction of magnetization of said soft magnetic layer occurs when said soft magnetic layer is not influenced by a sense current.

10. A magnetic recording apparatus comprising:
    a magnetic recording medium;
    a writing head oppositing the magnetic recording medium; and
    a magnetoresistive head oppositing the magnetic recording medium, the magnetoresistive head including:
    a soft magnetic layer for applying a linearizing bias,
    a non-magnetic layer formed on the soft magnetic layer,
    a ferro-magnetic magnetoresistance layer formed on the non-magnetic layer and having a length shorter than the non-magnetic layer,
    a pair of magnetic domain control magnetic layers formed on both sides of the ferro-magnetic magnetoresistance layer and on said non-magnetic layer, for controlling magnetic domains of the ferro-magnetic magnetoresistance layer, and a pair of conductive leads formed on both sides of the ferro-magnetic magnetoresistance layer, each being connected to each of the pair of magnetic domain control magnetic layers;

wherein said soft magnetic layer and said ferro-magnetic magnetoresistance layer are magnetically coupled so that the magnetization direction of said soft magnetic layer is in a direction opposite to the magnetization direction of said ferro-magnetic magnetoresistance layer.

11. A magnetic recording apparatus according to claim 10, wherein said pair of magnetic domain control magnetic layers are layered on said non-magnetic layer so that said non-magnetic layer separates said pair of magnetic domain control magnetic layers from said soft magnetic layer, wherein said soft magnetic layer is influenced through a side of each magnetic domain control magnetic layer in said pair so that a direction of magnetization in said soft magnetic layer is opposite the direction of magnetization in said pair.

12. A magnetic recording apparatus according to claim 10, wherein said opposite direction of magnetization of said soft magnetic layer occurs when said soft magnetic layer is not influenced by a sense current.

* * * * *